(12) United States Patent
Girard et al.

(10) Patent No.: US 10,336,409 B1
(45) Date of Patent: Jul. 2, 2019

(54) STORAGE ASSEMBLY FOR A VEHICLE

(71) Applicant: BOMBARDIER RECREATIONAL PRODUCTS INC., Valcourt (CA)

(72) Inventors: Etienne Girard, Orford (CA); Kim Ross, Valcourt (CA); Carl Begin, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/720,540

(22) Filed: Sep. 29, 2017

Related U.S. Application Data

(60) Provisional application No. 62/402,368, filed on Sep. 30, 2016.

(51) Int. Cl.
| | | |
|---|---|---|
| B63B 25/00 | (2006.01) | |
| B63B 35/73 | (2006.01) | |
| B60R 11/06 | (2006.01) | |
| B63B 19/14 | (2006.01) | |
| B60R 11/00 | (2006.01) | |
| B60R 7/04 | (2006.01) | |

(52) U.S. Cl.
CPC ............ B63B 25/002 (2013.01); B60R 11/06 (2013.01); B63B 19/14 (2013.01); B63B 35/731 (2013.01); B60R 7/04 (2013.01); B60R 2011/0094 (2013.01)

(58) Field of Classification Search
CPC ....... B63B 35/73; B63B 35/731; B63B 25/00; B63B 25/002; B63B 11/00; B63B 17/00; B63B 27/00; B63B 27/14; B63C 7/00; B60R 11/06

USPC ................................ 114/55.51, 55.53, 55.57
See application file for complete search history.

(56) References Cited

U.S. PATENT DOCUMENTS

| | | | |
|---|---|---|---|
| 5,097,789 | A | 3/1992 | Oka |
| 5,593,330 | A | 1/1997 | Kobayashi |
| 5,669,326 | A | 9/1997 | Ikeda |
| 5,752,867 | A | 5/1998 | Koyanagi et al. |
| 6,112,686 | A | 9/2000 | Tsumiyama et al. |
| 6,192,823 | B1 | 2/2001 | Tsumiyama et al. |
| 6,276,290 | B1 | 8/2001 | Yamada et al. |
| 6,530,336 | B2 | 3/2003 | Ibata et al. |
| 6,553,928 | B2 | 4/2003 | Yamada et al. |
| 6,626,124 | B2 | 9/2003 | Nakajima et al. |
| 6,668,742 | B2 | 12/2003 | Nadeau et al. |
| 6,722,301 | B2 | 4/2004 | Nagata et al. |

(Continued)

*Primary Examiner* — Lars A Olson
(74) *Attorney, Agent, or Firm* — BCF LLP

(57) ABSTRACT

A storage assembly for a vehicle has an outer compartment defined by an outer peripheral wall, an outer compartment lid operatively connected to the outer peripheral wall and moveable between an open position providing access to an interior of the outer compartment and a closed position blocking access to the interior of the outer compartment; and an inner compartment integrally formed within the outer compartment, the inner compartment being defined by an inner peripheral wall. The inner compartment comprises an inner compartment lid operatively connected to the inner peripheral wall and being moveable between an open position providing access to an interior of the inner compartment and a closed position blocking access to the interior of the inner compartment, and a sealing assembly for sealing the interior of the inner compartment when the inner compartment lid is in the closed position. A vehicle including the storage assembly is also disclosed.

20 Claims, 14 Drawing Sheets

(56) References Cited

U.S. PATENT DOCUMENTS

| | | |
|---|---|---|
| 6,959,660 B1 | 11/2005 | Packebush |
| 7,377,223 B2 | 5/2008 | Toupin et al. |
| 7,559,287 B2 | 7/2009 | Tsumiyama et al. |
| 8,037,835 B2 | 10/2011 | Miura et al. |
| 8,245,657 B2 | 8/2012 | Ross et al. |
| 8,555,799 B2 | 10/2013 | Otsuka et al. |
| 8,720,355 B2 | 5/2014 | Aoyama |
| 2003/0131776 A1 | 7/2003 | Nakajima et al. |

STORAGE ASSEMBLY FOR A VEHICLE

TECHNICAL FIELD

The present disclosure relates to a storage assembly for a vehicle, and a vehicle having a storage assembly.

BACKGROUND

Vehicles such as boats, personal watercraft, snowmobiles and ATVs, have storage compartments formed in a body portion of the vehicle and accessible by a user of the vehicle from an exposed side of the vehicle. One example of such a storage compartment is a glovebox which can be situated near a seat of the vehicle for convenient access to belongings stored therein. For example, in personal watercraft, a glovebox is formed in an upper deck and positioned in front of a straddle seat for easy access by the user. Although not generally the largest storage on a personal watercraft, it is desirable for manufacturers of personal watercraft to provide as large a glovebox as possible. However, the larger the glovebox lid, the harder it is to make waterproof.

Some of these gloveboxes include a seal such as a gasket between a glovebox lid and a glovebox wall. Compression of such a seal helps prevent liquid ingress into an interior of the glovebox. Deflection of the glovebox lid can result in the decompression of the seal and thereby allow the entry of water into the glovebox. As such, most conventional gloveboxes are not fully waterproof. This is particularly problematic on a personal watercraft which can flip over, thereby submerging the glovebox. Rather than risk damage to personal items stored in such gloveboxes, users sometimes resort to sealing their electronic items in sealable bags or small rigid cases before placing them in the glovebox.

Therefore, there is a desire for a storage compartment for a vehicle, including a personal watercraft, which addresses the abovementioned limitations of the prior art.

SUMMARY

It is an object of the present to ameliorate at least some of the inconveniences present in the prior art.

From one aspect there is provided a storage assembly for a vehicle. The storage assembly comprises an outer compartment defined by an outer peripheral wall. The outer compartment also comprises an outer compartment lid operatively connected to the outer peripheral wall which is moveable between an open position providing access to an interior of the outer compartment and a closed position blocking access to the interior of the outer compartment. The storage assembly also comprises an inner compartment integrally formed within the outer compartment and enclosed thereby, the inner compartment being defined by an inner peripheral wall, and also comprising an inner compartment lid operatively connected to the inner peripheral wall and being moveable between an open position providing access to an interior of the inner compartment and a closed position blocking access to the interior of the inner compartment, and a sealing assembly for sealing the interior of the inner compartment when the inner compartment lid is in the closed position.

In some implementations, the sealing assembly comprises a seal associated with one or both of the inner peripheral wall and the inner compartment lid. The seal can be a gasket positioned between inter-engageable portions of the inner peripheral wall and the inner compartment lid.

In some implementations, the inter-engageable portions comprise a sealing ridge extending from an underside of the inner compartment lid and receivable in a channel formed along a rim of at least a portion of the inner peripheral wall, the channel containing the gasket therein. The channel may have inner and outer channel arms, the inner channel arm being higher than the outer channel arm.

In some implementations, at least a part of the inner peripheral wall is integral with at least a part of the outer peripheral wall. The inner compartment lid may be moveably connected to the inner peripheral wall by at least one hinge.

In some implementations, the storage assembly further comprises an inner closure assembly for securing the inner compartment lid in the closed position, the inner closure assembly comprising an associated pair of interconnectable portions for acting between the inner compartment lid and the inner peripheral wall. The inner closure assembly can be one of a latch, a clip, a catch, a buckle, a lock, a clasp or a bolt. In some implementations, the inner closure assembly comprises a plurality of the associated pair of interconnectable portions positioned around a periphery of the inner compartment lid. The inner compartment may comprise three hinges positioned along a first side of the inner compartment lid and two inner closure assemblies along the periphery of the inner compartment lid along a second side of the inner compartment lid. The first side may be opposite the second side. A spacing between pressure points along the periphery of the inner compartment lid may be less than a spacing of pressure points along a periphery of the outer compartment lid.

In some implementations, the inner peripheral wall defines a sealable storage space that has a vertical height dimension, a lateral width dimension and a forward-rear depth dimension, the height and width dimensions being greater than the depth dimension. The inner compartment lid may have a greater average thickness per unit area than the outer compartment lid.

In some implementations, the inner peripheral wall comprises a forward wall, a rear wall and two side walls defining an opening into the interior of the inner compartment, one of said forward and rear walls being shorter than the other to present an angled opening.

In some implementations, the inner compartment further comprises a pocket for receiving an item, the pocket comprising at least one pocket wall defining a pocket opening, at least a portion of the at least one pocket wall being made of a resilient material. The pocket may comprise at least one foam block with a slit formed therein for receiving the item. The inner compartment may further comprise an electrical connection.

In some implementations, the storage assembly further comprises an outer closure assembly for maintaining the outer compartment lid in the closed position, the outer closure assembly comprising associated interconnectable portions for acting between the outer compartment lid and the outer peripheral wall. The outer closure assembly may be one of a latch, a clip, a catch, a buckle, a lock, a clasp or a bolt.

In some implementations, the outer compartment lid is operatively connected to the outer peripheral wall by at least one hinge. The inner compartment may be positioned proximate the at least one hinge of the outer compartment. The inner compartment lid and the outer compartment lid may open in the same direction. In some implementations, the outer compartment comprises two hinges positioned along a first side of the outer compartment lid and one outer closure assembly along a second side of the outer compartment lid, opposite the first side. In some implementations, the outer compartment is a glovebox for a straddle seat vehicle.

From another aspect, there is provided a vehicle comprising a vehicle body having at least one external surface; an engine disposed at least in part in the vehicle body; a propulsion system connected to the vehicle body and operatively connected to the engine; a storage assembly provided in the vehicle body, the storage assembly comprising: an outer compartment defined by an outer peripheral wall, the outer compartment also comprising an outer compartment lid operatively connected to the outer peripheral wall and being moveable between an open position providing access to an interior of the outer compartment and a closed position blocking access to the interior of the outer compartment; and an inner compartment integrally formed within the outer compartment and enclosed thereby, the inner compartment being defined by an inner peripheral wall, and further comprising an inner compartment lid operatively connected to the inner peripheral wall and being moveable between an open position providing access to an interior of the inner compartment and a closed position blocking access to the interior of the inner compartment, and a sealing assembly for sealing the interior of the inner compartment when the inner compartment lid is in the closed position.

In some implementations, the sealing assembly comprises a seal associated with one or more of the inner peripheral wall and the inner compartment lid. The seal may be a gasket acting between inter-engageable portions of the inner peripheral wall and the inner compartment lid. In some implementations, the inter-engageable portions comprise a sealing ridge extending from an underside of the inner compartment lid and receivable in a channel formed along a rim of the inner peripheral wall, the channel containing the gasket therein. The channel may have inner and outer channel arms, the inner channel arm being higher than the outer channel arm.

In some implementations, at least a part of the inner peripheral wall is integral with at least a part of the outer peripheral wall.

In some implementations, the inner compartment lid is moveably connected to the inner peripheral wall by at least one hinge, the hinge positioned at a forward portion of the inner compartment. The storage assembly may further comprise an inner closure assembly for securing the inner compartment lid in the closed position, the inner closure assembly comprising an associated pair of interconnectable portions acting between the inner compartment lid and the inner peripheral wall. The inner closure assembly may be one of a latch, a clip, a catch, a buckle, a lock, a clasp or a bolt. In some implementations, the inner closure assembly comprises a plurality of the associated pair of interconnectable portions positioned around a periphery of the inner compartment lid. The inner compartment may comprise three hinges positioned along a first side of the inner compartment lid and two inner closure assemblies along the periphery of the inner compartment lid along a second side of the inner compartment lid, opposite the first side. A spacing between pressure points along the periphery of the inner compartment lid may be less than a spacing of pressure points along a periphery of the outer compartment lid.

In some implementations, the inner peripheral walls define an interior sealable storage space that has a height and a width greater than a depth, the width extending laterally. The inner compartment lid may have a greater average thickness per unit area than the outer compartment lid. The inner peripheral wall may comprise a forward wall and a rear wall defining an opening into the interior of the inner compartment, one of said side walls being shorter than the other to present an angled opening.

In some implementations, the inner compartment further comprises a pocket for receiving an item, the pocket comprising at least one pocket wall defining a pocket opening, at least a portion of the at least one pocket wall being made of a resilient material. The pocket may comprise at least one foam block with a slit formed therein for receiving the item. The inner compartment further comprises an electrical connection.

In some implementations, the storage assembly further comprises an outer closure assembly for maintaining the outer compartment lid in the closed position, the outer closure assembly comprising interconnectable portions acting between the outer compartment lid and the outer peripheral wall. The outer closure assembly may be one of a latch, a clip, a catch, a buckle, a lock, a clasp or a bolt. In some implementations, the outer compartment lid is moveably connected to the outer peripheral wall by at least one hinge. The inner compartment may be positioned proximate the at least one hinge of the outer compartment. The outer compartment comprises two hinges positioned along a first side of the outer compartment lid and one outer closure assembly along a second side of the outer compartment lid.

In some implementations, the vehicle further comprises a straddle seat, wherein the storage assembly is positioned forward of the straddle seat. The vehicle may further comprise a handlebar, the storage assembly being positioned between the handlebar and the straddle seat.

In some implementations, the vehicle is a personal watercraft, and the vehicle body comprises a hull, and a deck supported on the hull, the straddle seat being provided on the deck, the propulsion system being connected to the hull, and the storage assembly provided in the deck. The outer compartment may be a glovebox formed in the deck of the personal watercraft. In some implementations, the deck further comprises a ridge extending along at least a portion of an outer perimeter of the outer compartment. The storage assembly may be integrally formed in the deck.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as a deck or hull for example, should be understood as they would be understood when these components or sub-assemblies are mounted to the vehicle, unless specified otherwise in this application. The term "straddle seat" refers to a seat on which a person normally sits astride. The term "motor" can refer to any component capable of driving the motion of a watercraft, which includes but is not limited to an internal combustion engine or an electric motor.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

A storage assembly will be described with respect to a personal watercraft. However, it is contemplated that the storage assembly could be provided in different types of vehicles, such as any vehicle requiring a sealable storage area accessible from an exposed side of the vehicle, such as side-by-side vehicles (SSVs) or vehicles having a straddle-seat, such as motorbikes, all-terrain vehicles (ATVs), snowmobiles, other waterborne vessels and on-road vehicles.

Figure 1:
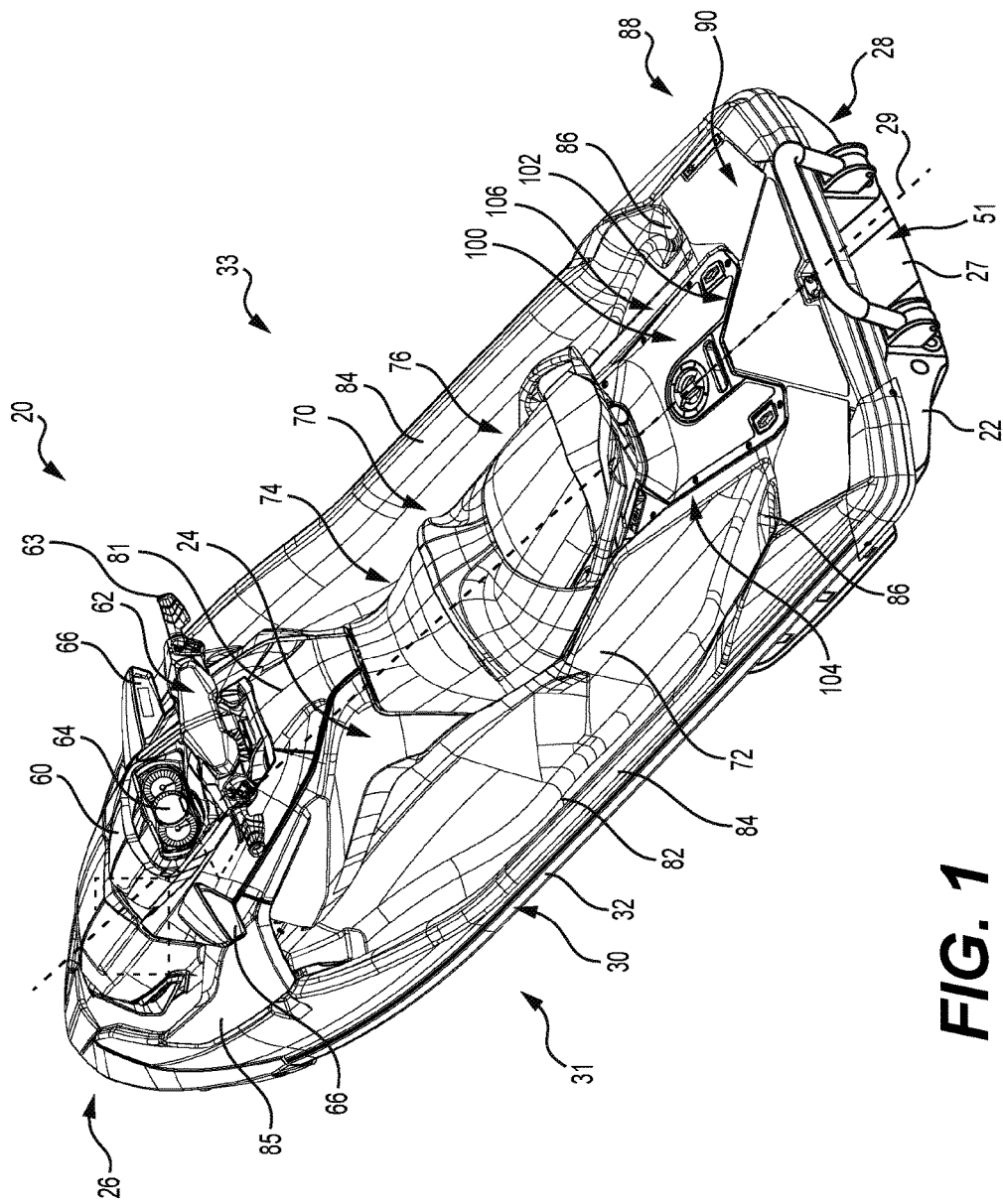
FIG. 1 is a top, left, rear side perspective view of a personal watercraft, including a storage assembly according to one implementation of the present technology.
Figure 2:
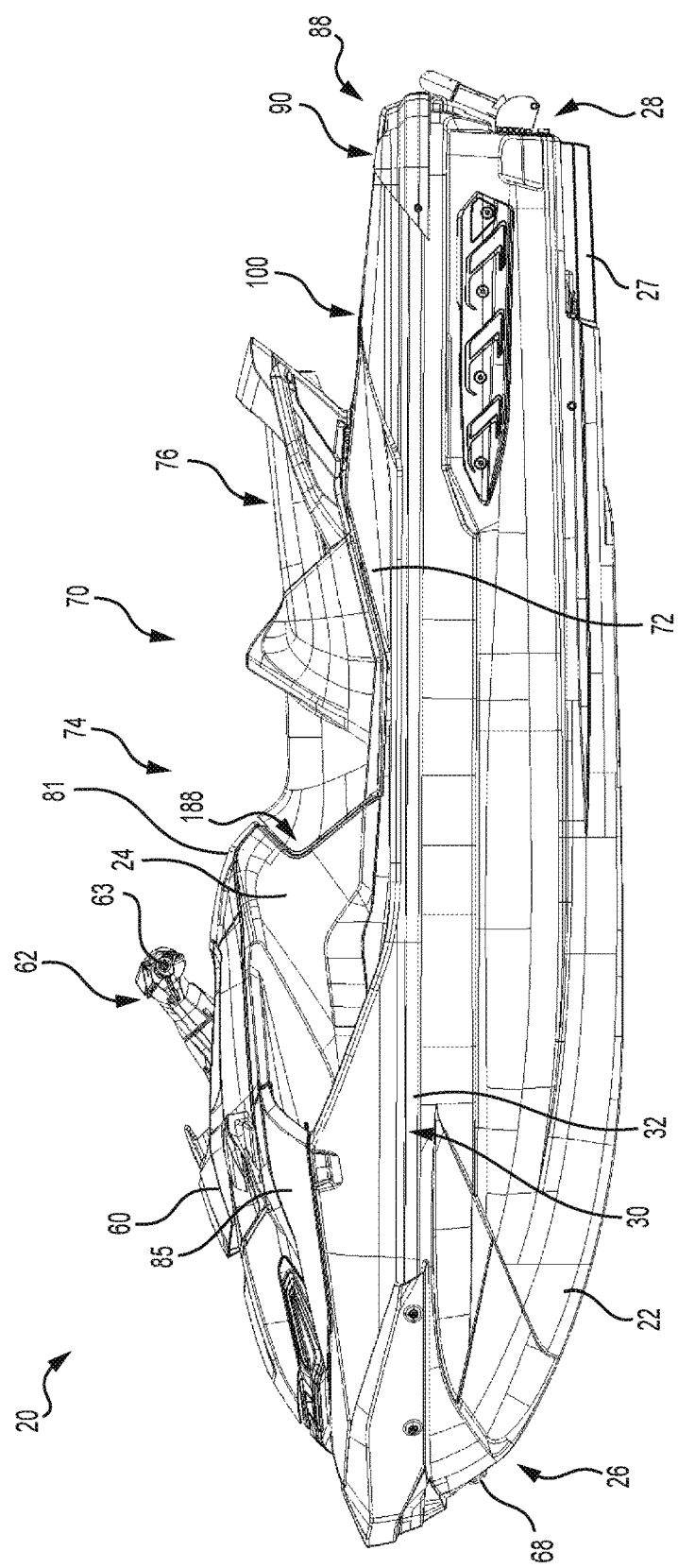
FIG. 2 is a left side elevation view of the personal watercraft of FIG. 1.
Figure 3:
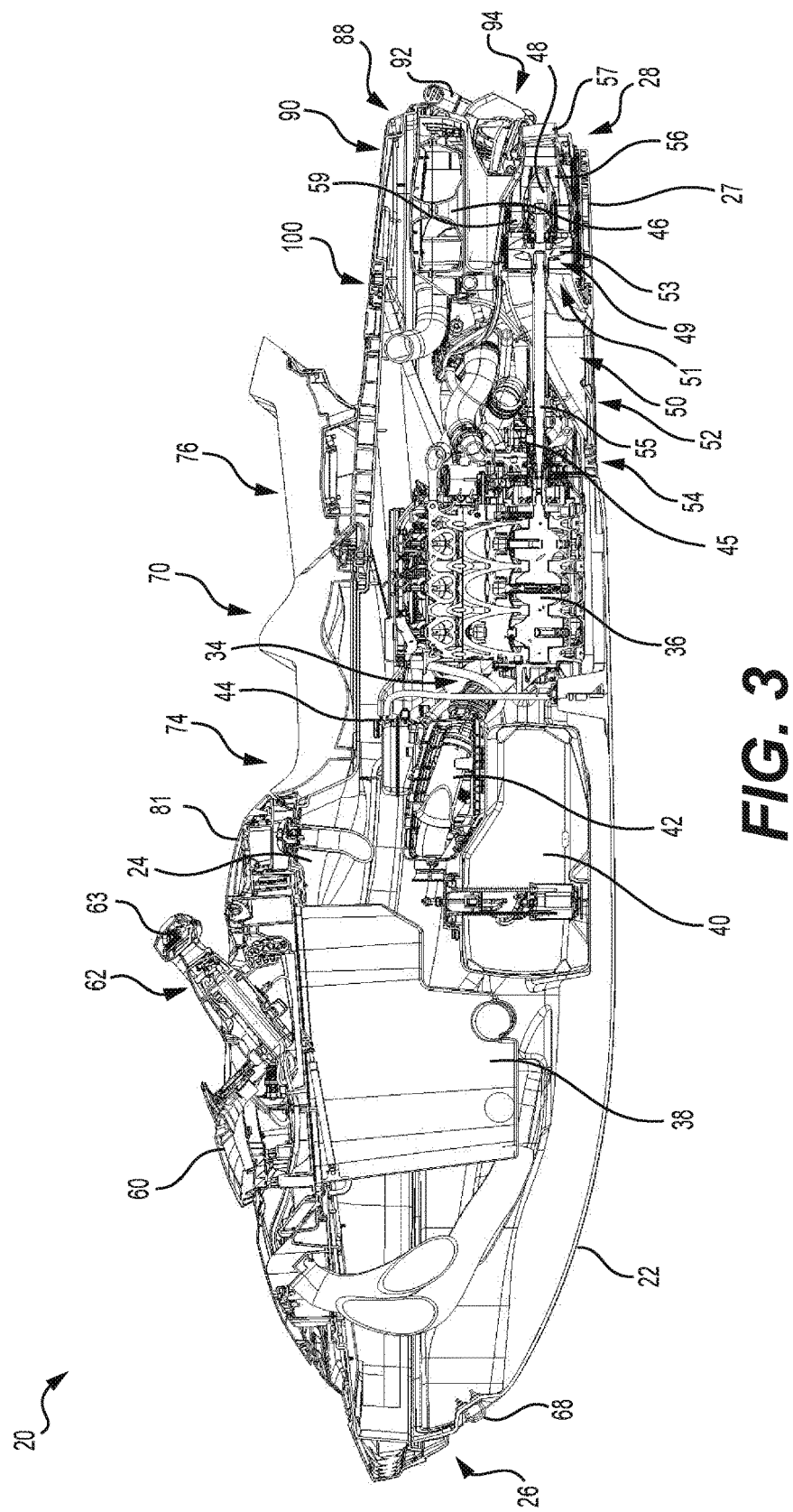
FIG. 3 is a longitudinal cross-section of the personal watercraft of FIG. 1.

Referring to FIGS. 1 to 3, an implementation of a personal watercraft 20 is shown. The personal watercraft 20 has a hull 22 and a deck 24. The hull 22 and the deck 24 are made of fiberglass composite material. It is contemplated that other suitable materials could be used to make the hull 22 and the deck 24. The hull 22 buoyantly supports the personal watercraft 20 in the water. The hull 22 has a bow 26 and a stern 28. A longitudinal centerline 29 extends between the bow 26 and the stern 28 and splits the deck 24 into a left longitudinal side 31 and a right longitudinal side 33 (FIG. 1). For the purpose of the following description, the components that are qualified as "left" or "right" are positioned on the corresponding left longitudinal side 31 and right longitudinal side 33 of the deck 24, unless mentioned otherwise.

The deck 24 is designed to accommodate an operator and two passengers, collectively referred to as riders. It is contemplated that the deck 24 could be designed to accommodate more or less than two passengers. The hull 22 and the deck 24 are joined together at a seam 30 that joins the parts in a sealing relationship. The seam 30 comprises a bond line formed by an adhesive. Other known joining methods could be used to sealingly engage the parts together, including but not limited to thermal fusion, molding or fasteners such as rivets, bolts or screws. A bumper 32 generally covers the seam 30. The bumper 32 helps to prevent damage to the outer surface of the personal watercraft 20 when the personal watercraft 20 is docked, for example. The bumper 32 can extend around the bow 26 and the stern 28, as shown, or around any portion or the entire seam 30.

The space between the hull 22 and the deck 24 forms a volume commonly referred to as the motor compartment 34 (FIG. 3). The motor compartment 34 accommodates a motor 36, in the form of an internal combustion engine, as well as a storage bin 38, a fuel tank 40, an air box 42, an electrical system 44 (battery, electronic control unit, etc.), a resonator 46 and other elements required or desirable in the personal watercraft 20. The motor 36 drives a water jet propulsion system 48 of the personal watercraft 20, although other types of propulsion systems are contemplated in other implementations.

The hull 22 defines part of an intake ramp 50 extending from an inlet 52 to a jet pump 49 of the jet propulsion system 48. The intake ramp 50 allows passage of water from underneath the hull 22, through the inlet 52 defined on a bottom 54 of the hull 22, and into the jet pump 49. The jet pump 49 is located in a formation in the hull 22, referred to as a tunnel 51. The tunnel 51 is defined at the front, sides and top by the hull 22. As can be seen in FIGS. 1 to 3, the bottom of the tunnel 51 is closed by a ride plate 27. The ride plate 27 creates a surface on which the personal watercraft 20 rides or planes at high speeds.

The jet pump 49 includes an impeller 53 and a stator 59. The impeller 53 is coupled to the motor 36 by one or more shafts 55, such as a driveshaft and an impeller shaft. The rotation of the impeller 53 pressurizes the water, which then moves over the stator 59 that is made of a plurality of fixed stator blades (not shown). The role of the stator blades is to decrease the rotational motion of the water so that energy given to the water is used for thrust, as opposed to swirling the water. Once the water leaves the jet pump 49, it goes through a venturi 56. Since an exit diameter of the venturi 56 is smaller than an entrance diameter of the venturi 56, the water is accelerated further, thereby providing more thrust. A steering nozzle 57 is pivotally attached to the venturi 56 so as to pivot about a vertical axis (not shown). The steering nozzle 57 could also be supported at the exit of the tunnel 51 in other ways without a direct connection to the venturi 56. Moreover, the steering nozzle 57 can be replaced by a rudder or other diverting mechanism disposed at the exit of the tunnel 51 to selectively direct the thrust generated by the water jet propulsion system 48 to effect turning.

The steering nozzle 57 is operatively connected to a helm assembly 62, including a handlebar 63, preferably via a push-pull cable (not shown) such that when the helm assembly 62 is turned, the steering nozzle 57 pivots. This movement redirects the pressurized water coming from the venturi 56, so as to redirect the thrust and steer the personal watercraft 20 in the desired direction.

Still referring to FIGS. 1 to 3, towards the bow 26, the deck 24 has a hood 60 including the helm assembly 62 and an instrument cluster 64. A hinge (not shown) is attached between a forward portion of the hood 60 and the front of the deck 24 to allow the hood 60 to move to an open position to provide access to the storage bin 38. One or more latches (not shown) located at a rearward portion of the hood 60 locks the hood 60 into a closed position. When in the closed position, the hood 60 prevents water from entering the storage bin 38. Left and right rearview mirrors 66 are positioned on corresponding left and right sides of the hood 60 to allow the operator to see behind the watercraft 20. A hook 68 is located at the bow 26 of the hull 22. The hook 68 is used to attach the watercraft 20 to a dock when the watercraft 20 is not in use or to attach to a winch when loading the watercraft 20 on a trailer, for instance.

The deck 24 has a centrally positioned straddle seat 70 supported on top of a pedestal 72 formed by the deck 24. Accordingly, the seat 70 and the pedestal 72 are laterally aligned with the longitudinal centerline 29 of the deck 24. The seat 70 accommodates two riders in a straddling position. The seat 70 has a front seat portion 74 and rear seat portion 76 made as cushioned or padded units.

A glovebox 81 is provided forward of the straddle seat 70 and rearward of the helm assembly 62. The glovebox 81 comprises a storage assembly 200, according to certain implementations of the present technology, which is formed in the deck 24 and has a sealable inner compartment 208, as will be described below with reference to FIGS. 4 to 14.

The deck 24 forms footwells 82 that provide support for the riders' feet. Along the footwells 82, the watercraft 20 has a pair of generally upwardly extending walls located on either side of the watercraft 20 known as gunwales or gunnels 84. The gunnels 84 help to prevent the entry of water in the footwells 82 of the watercraft 20, provide lateral support for the riders' feet, and also provide buoyancy when turning the watercraft 20. Towards the bow 26, fairings 85 extend between the gunnels 84 and the hood 60 and further prevent the entry of water in the footwells 82. Towards the stern 28, the gunnels 84 extend inwardly to act as heel rests 86. A passenger riding the personal watercraft 20 and sitting backwards on the seat 70 facing towards the rear may place his or her heels on the heel rests 86, thereby providing a more stable riding position when acting as spotter for a skier, tuber or the like. It is contemplated that the heel rests 86 could also be formed separately from the gunnels 84. Forward of a rear end 88 of the deck 24, the deck 24 includes a reboarding platform 90 allowing a rider to easily reboard the watercraft 20 from the water. The reboarding platform 90 extends longitudinally between a transom 94 of the personal watercraft 20 and the heel rests 86. The reboarding platform 90 extends laterally over a width of the deck 24, between left longitudinal side 31 and right longitudinal side 33 of the deck 24.

The personal watercraft 20 has a rear platform 100. The rear platform 100 is laterally centered on the deck 24, i.e. laterally centered along the longitudinal centerline 29 of the deck 24. The rear platform 100 extends forwards between footwells 82, from the reboarding platform 90. The rear platform 100 extends laterally between the left and right sides 104, 106.

Figure 4:
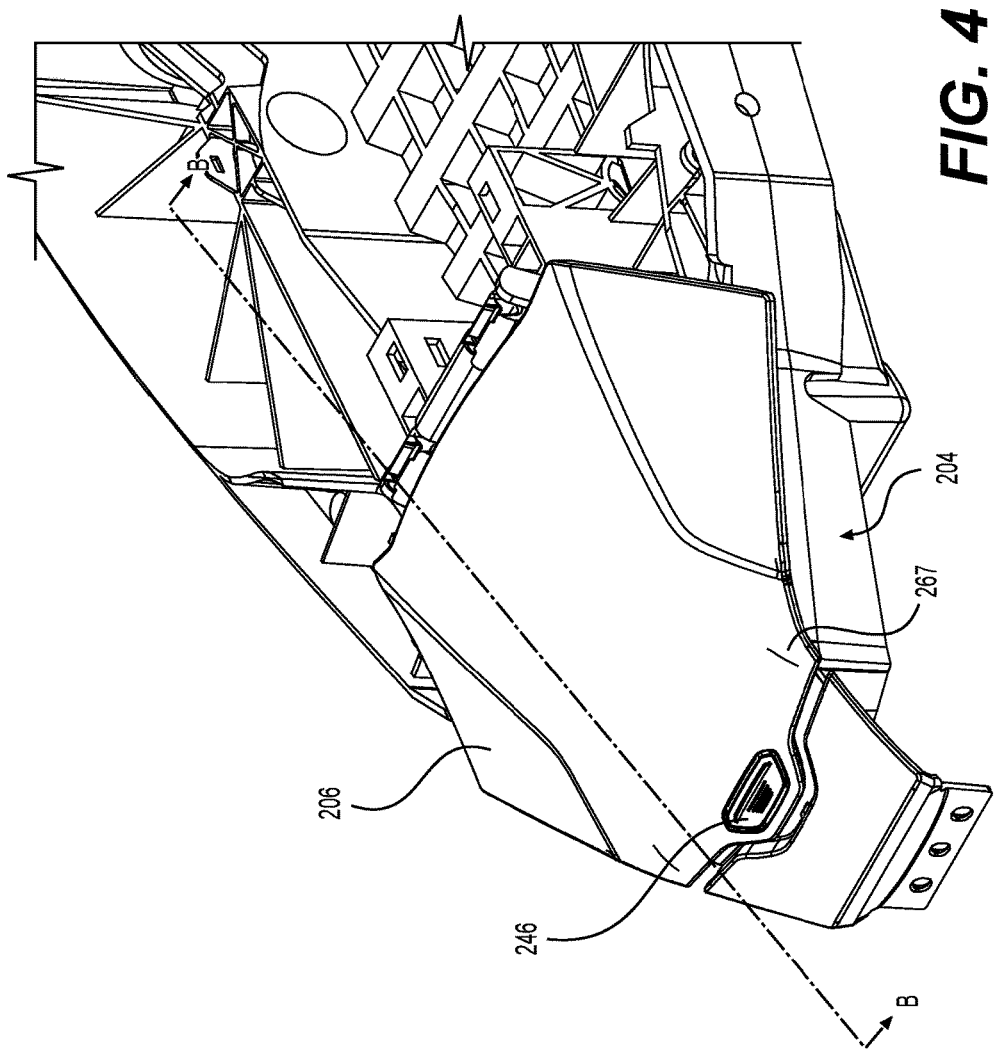
FIG. 4 is a top, right, rear side perspective view of the storage assembly of the personal watercraft of FIG. 1 with an outer compartment lid in a closed position.
Figure 5:
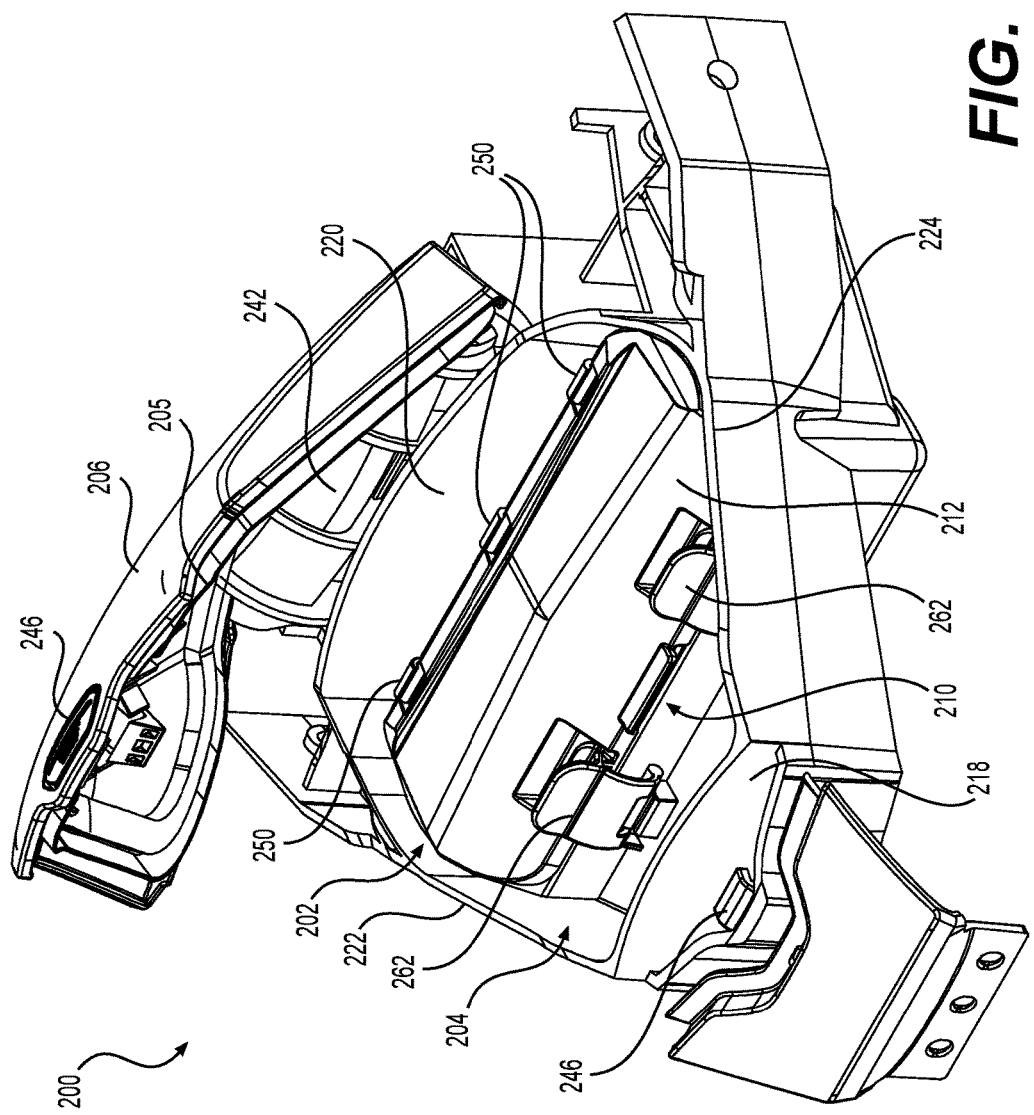
FIG. 5 is a top, right, rear side perspective view of the storage assembly of FIG. 4 with the outer compartment lid in an open position and an inner compartment lid in a closed position.
Figure 6:
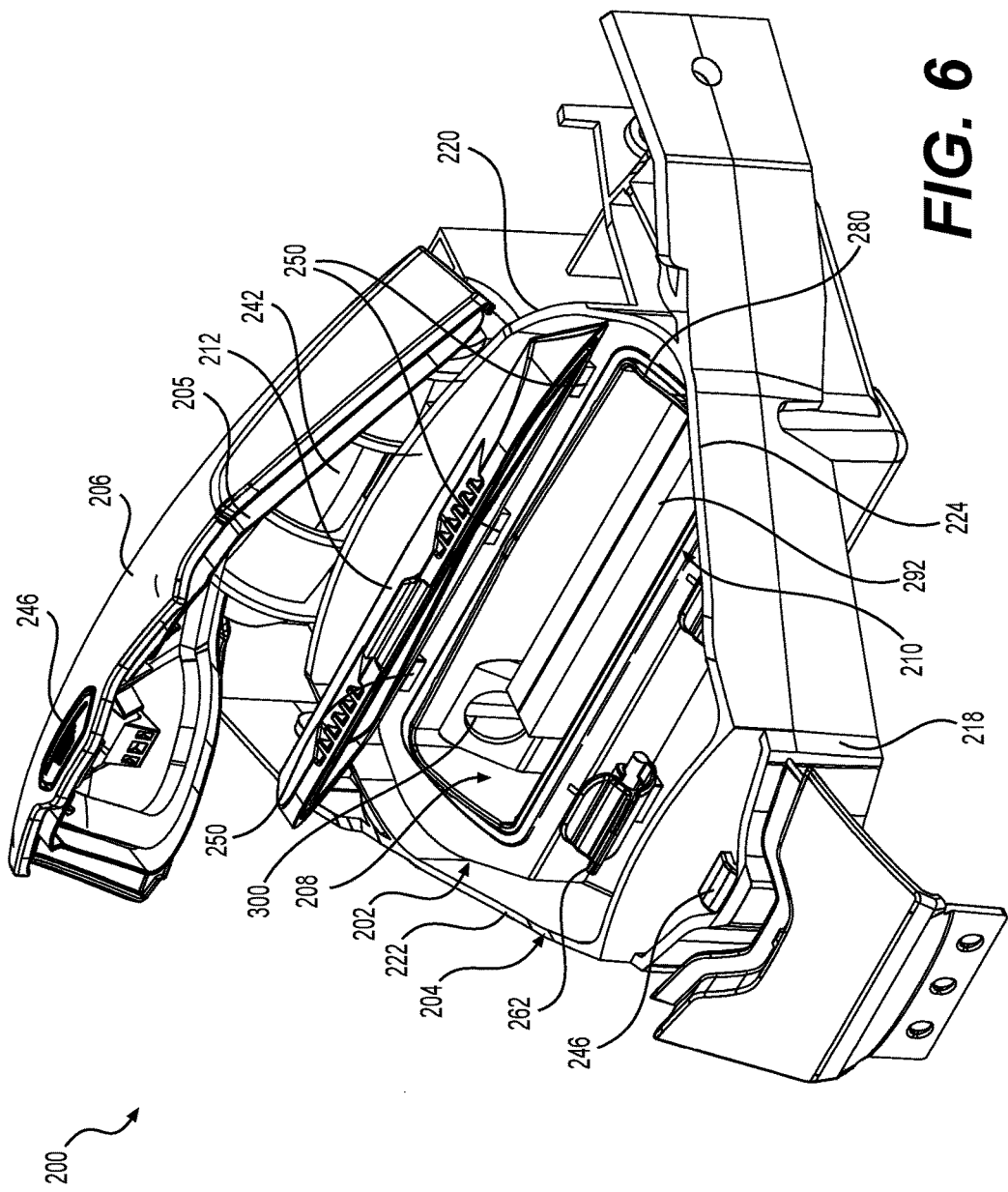
FIG. 6 is a top, right, rear side perspective view of the storage assembly of FIG. 4 with the outer compartment lid in an open position and the inner compartment lid in an open position.
Figure 7:
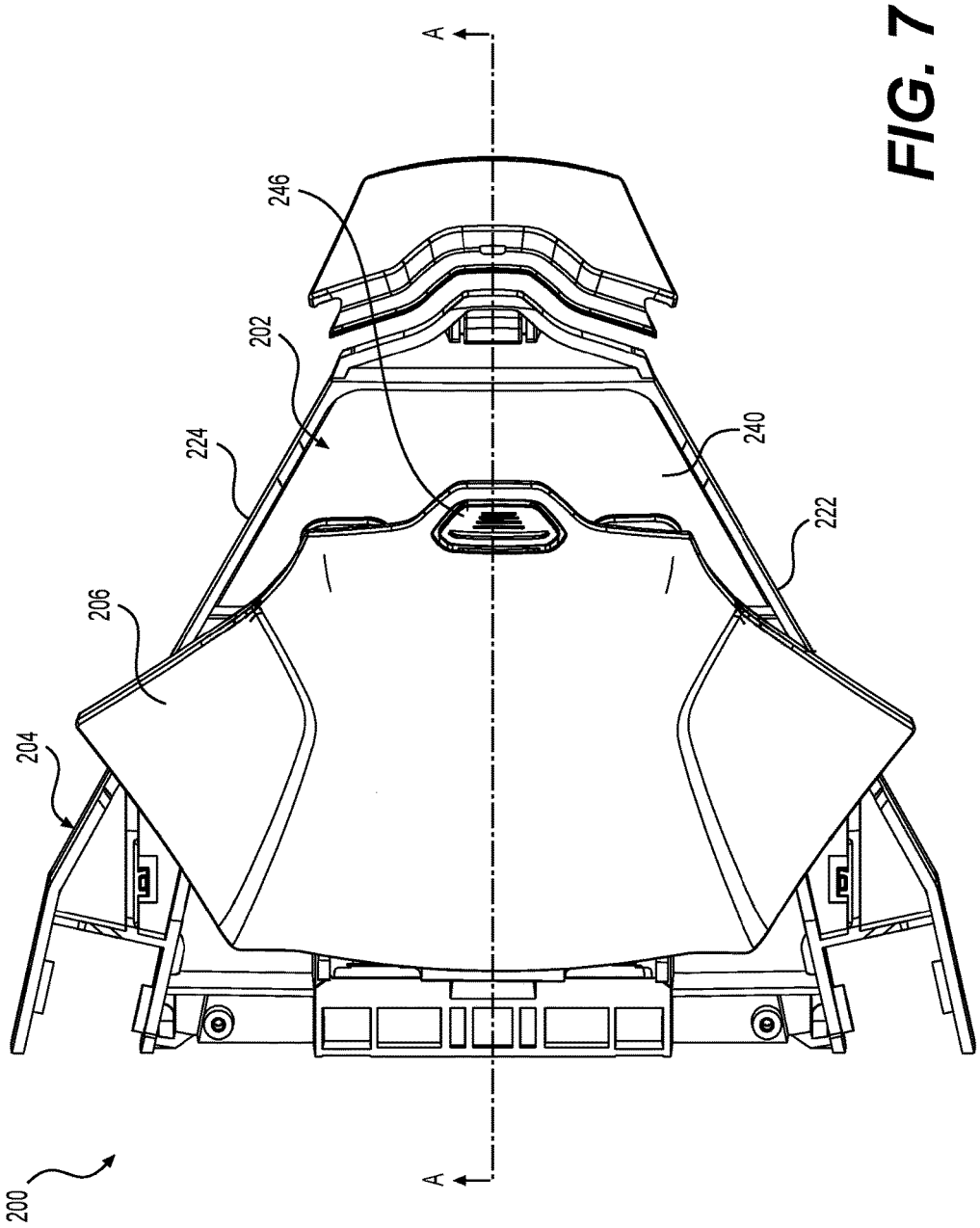
FIG. 7 is a top plan view of the storage assembly of FIG. 4 with the outer compartment lid in a partially open position.

With reference to FIGS. 4 to 14, the storage assembly 200 comprises an outer compartment 202 defined by an outer peripheral wall 204, and includes an outer compartment lid 206 operatively connected to the outer peripheral wall 204 (FIG. 5). The outer compartment lid 206 is moveable between an open position (shown in FIGS. 5, 6, 7, 10 and 11) providing access to an interior of the outer compartment 202, and a closed position (shown in FIGS. 4, 12 and 13) blocking access to the interior of the outer compartment 202. As best seen in FIG. 4, the outer peripheral wall 204 is integrally formed within the deck 24. It is contemplated that the outer peripheral wall 204 may be separate from the deck 24. When the outer compartment lid 206 is in the closed position, it forms a substantially continuous surface with an adjacent portion of the deck 24. When the outer compartment lid 206 is in the open position, it can deflect wind and keep spray out of the outer and inner compartment interiors. A seal 205 is provided between the outer peripheral wall 204 and the outer compartment lid 206 (best seen in FIG. 12).

The storage assembly 200 also comprises a sealable inner compartment 208 positioned within the outer compartment 202 and integrally formed with the outer compartment 202. The inner compartment 208 is defined by an inner peripheral wall 210, and includes an inner compartment lid 212. The inner compartment lid 212 is operatively connected to the inner peripheral wall 210 and is moveable between an open position (shown in FIGS. 6 and 11) providing access to an interior of the inner compartment 208 and a closed position (shown in FIGS. 5, 10, 12 and 13), blocking access to the interior of the inner compartment 208. The inner compartment lid 212 comprises a sealing assembly 214 (FIGS. 10, 12 and 13) for sealing the interior of the inner compartment 208 when the inner compartment lid 212 is in the closed position.

At least when the inner compartment lid 212 is in the closed position, the inner compartment 208 and the inner compartment lid 212 are entirely contained within the interior of the outer compartment 202. Access to the inner compartment lid 212 and hence to the interior of the inner compartment 208 is through the outer compartment 202. The inner compartment 208 is smaller than the outer compartment 202, and the inner compartment lid 212 is smaller than the outer compartment lid 206. As the inner compartment lid 212 is generally hidden from view by the outer compartment lid 206 in use, and is smaller than the outer compartment lid 206, the aesthetic and economical restrictions applying to the outer compartment lid 206 do not apply to the inner compartment lid 212. For example, the inner compartment lid 212 has an average thickness which is greater than an average thickness of the outer compartment lid 206 so as to provide increased rigidity to the inner compartment lid 206. The inner compartment lid 212 has a higher rigidity than the outer compartment lid 206.

Figure 8:
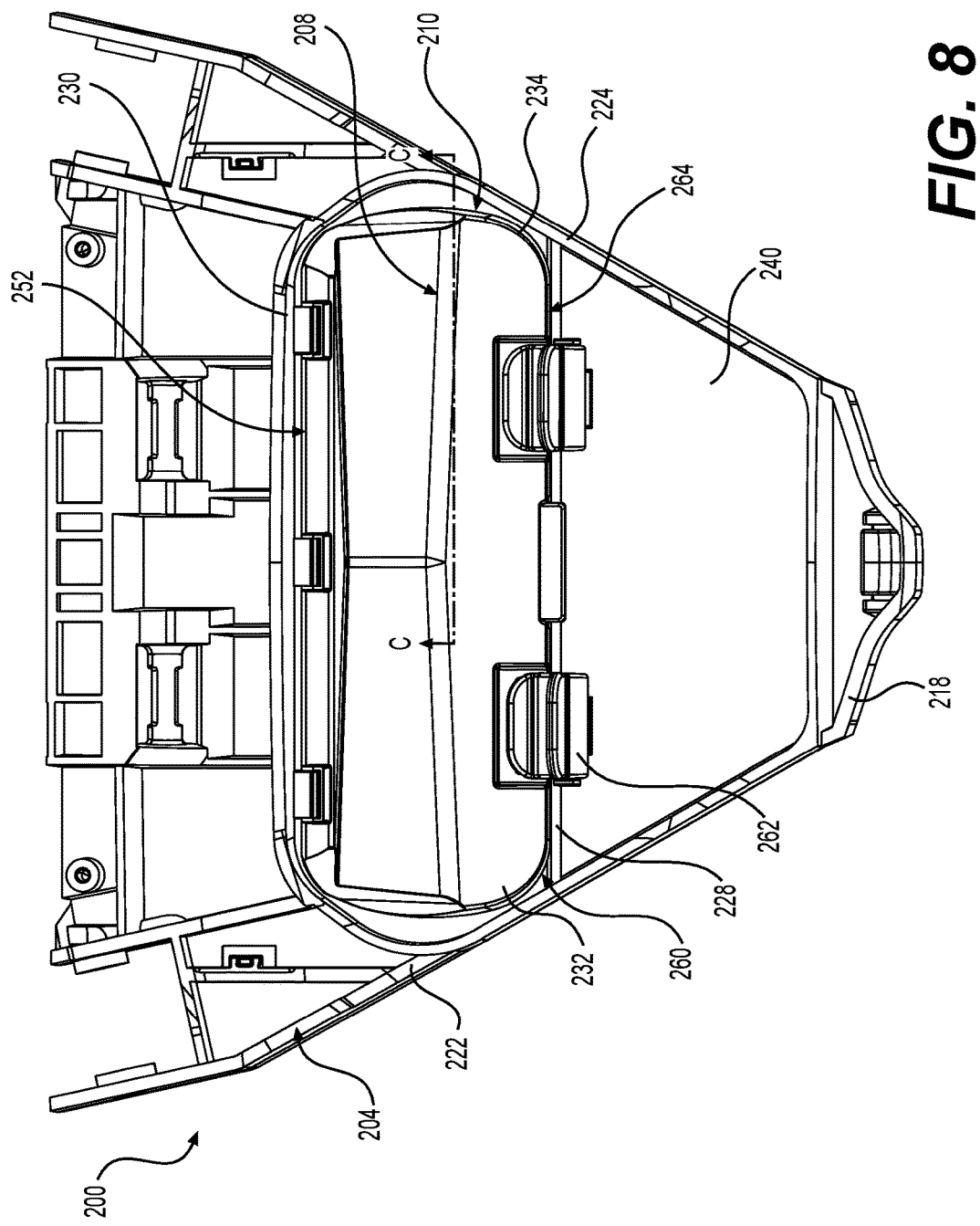
FIG. 8 is a top plan view of the storage assembly of FIG. 4 with the outer compartment lid removed.
Figure 10:
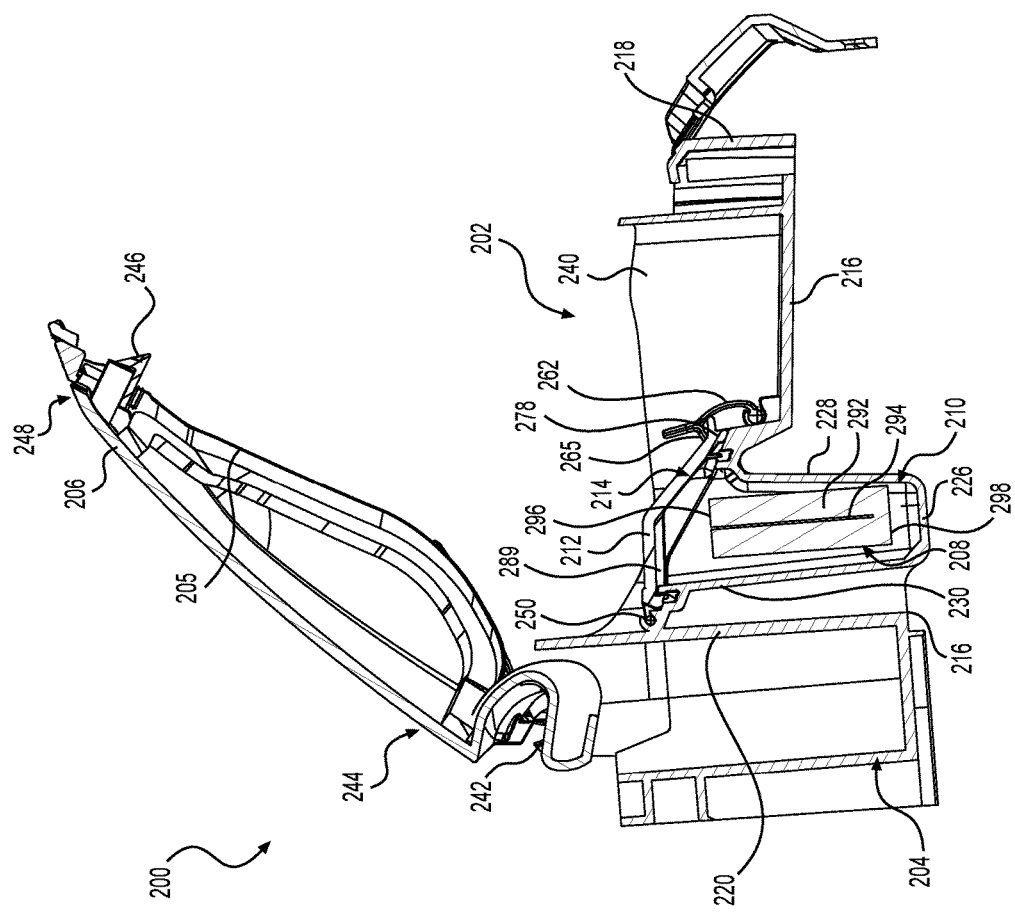
FIG. 10 is a cross-sectional view along the line A-A of FIG. 7 showing the outer compartment lid in the open position and the inner compartment lid in the closed position.

As best seen in FIGS. 8 and 10, the outer peripheral wall 204 defining the outer compartment 202 comprises, at least in part, a base 216, and a rear wall 218, a forward wall 220, and two side walls 222, 224 extending generally upwardly from the base 216. The inner peripheral wall 210 defining the inner compartment 208 comprises, at least in part, a base 226, a rear wall 228, a forward wall 230, and two side walls 232, 234 extending generally upwardly from the base 226. At least a portion of the outer peripheral wall 204 is integral with at least a portion of the inner peripheral wall 210. For example, at least a portion of the forward wall 220 of the outer compartment 202 is integral with at least a portion of the forward wall 230 of the inner compartment 208, and at least a portion of the base 226 of the inner compartment 208 is integral with at least a portion of the base 216 of the outer compartment 202.

Figure 12:
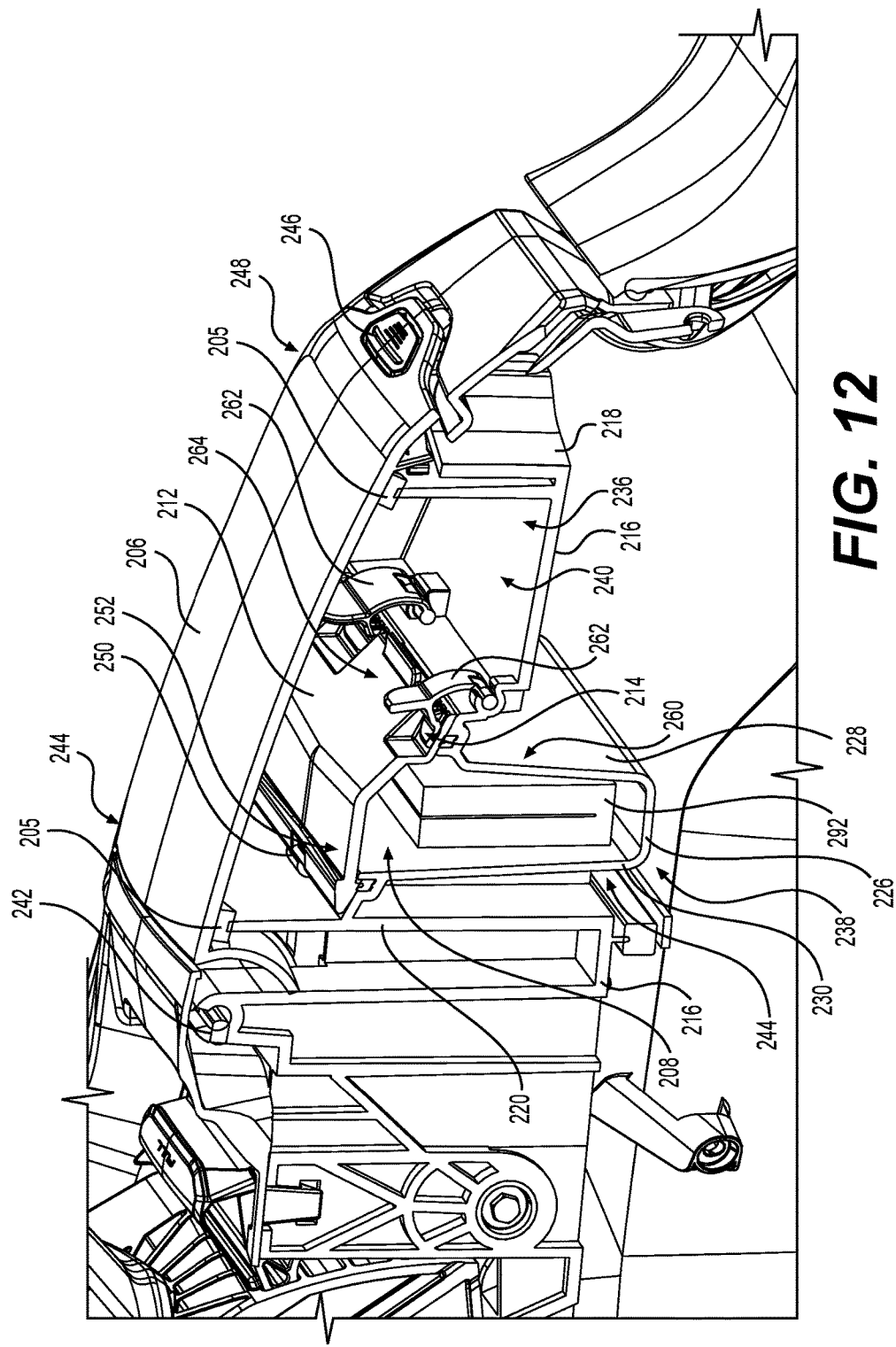
FIG. 12 is a cross-sectional perspective view along the line B-B of FIG. 4 with a portion of the deck visible and portions of the seat removed for clarity, showing the outer compartment lid in the closed position.

With particular reference to FIG. 12, the outer compartment 202 comprises a rearward portion 236 and a forward portion 238. The inner compartment 208 is formed in the forward portion 238 of the outer compartment 202, proximate the forward wall 220 of the outer component 202. At the rearward portion 236 of the outer compartment 202, the base 216 of the outer compartment 202 extends rearwardly from the inner compartment 208, and together with the outer compartment rear wall 218 and side walls 222, 224, and a portion of the inner compartment rear wall 228 defines at least a portion of an outer compartment storage area 240. When the inner compartment lid 212 is in the closed position, the outer compartment storage area 240 also includes the area above the closed inner compartment lid 212.

The outer compartment lid 206 is operatively connected to the outer peripheral wall 204 at the forward portion 238 of the outer compartment 202 by an outer hinge 242. This configuration allows a rider seated on the seat 70 of the personal watercraft 20 to open the outer compartment lid 206 and to access the outer and inner compartments 202, 208 from the seated position. The outer hinge 242 acts between adjacent edges of the outer peripheral wall 204 and the outer compartment lid 206. Specifically, the outer hinge 242 is associated with adjacent edges of the forward wall 220 of the outer compartment 202 and a forward portion 244 of the outer compartment lid 206. At the rearward portion 236 of the outer compartment 202, an outer closure assembly, which in the present implementation is a latch 246, is provided for securing the outer compartment lid 206 in the closed position. The latch 246 acts between a rearward portion 248 of the outer compartment lid 206 and the rear wall 218 of the outer compartment 202. Instead of, or in addition to, the latch 246, any other outer closure assembly can be used, such as those comprising interconnectable portions acting between the outer compartment lid 206 and the outer peripheral wall 204, or between the outer compartment lid 206 and the deck 24. Suitable outer closure assemblies include one or more of clips, catches, buckles, locks, clasps, and the like.

Turning now to the inner compartment 208, the inner compartment lid 212 is operatively connected to the inner peripheral wall 210 by at least one inner hinge 250. As best seen in FIGS. 5 to 6, and 8 to 11, three interspaced inner hinges 250 are provided along adjacent edges of the forward wall 230 of the inner compartment 208 and a forward portion 252 of the inner compartment lid 212. This configuration allows a seated rider of the personal watercraft 20 to access the inner compartment 208 by opening the outer compartment lid 206 and the inner compartment lid 212 whilst in the seated position. The three hinges 250 comprise a central hinge 250 positioned substantially mid-way along the forward wall edge, and two side hinges 250 positioned one on either side of the central hinge 250 along the forward wall 230 edge of the inner compartment 208.

Figure 11:
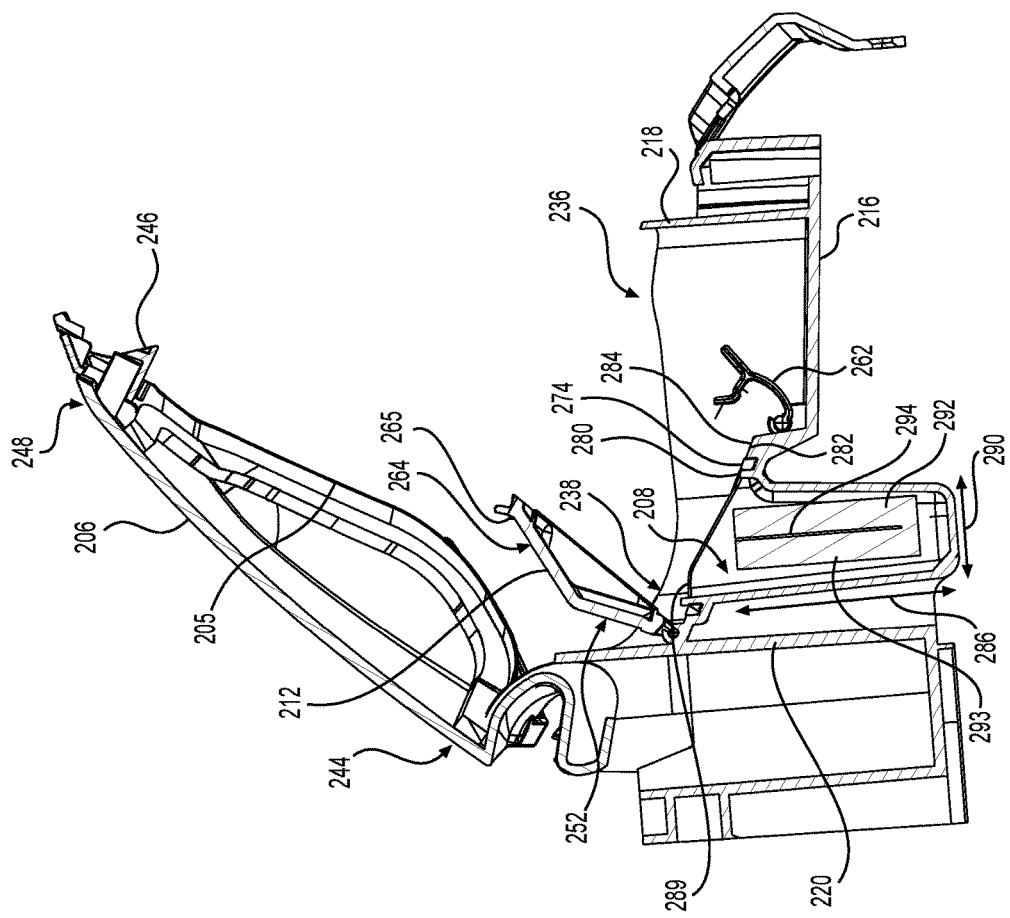
FIG. 11 is a cross-sectional view along the line A-A of FIG. 7 showing the outer compartment lid in the open position and the inner compartment lid in the open position.

At a rearward portion 260 of the inner compartment 208, an inner closure assembly 262, in this case two latches 262 interspaced from one another, is provided for securing the inner compartment lid 212 in the closed position. The latches 262 act between a rearward portion 264 of the inner compartment lid 212 and the rear wall 228 of the inner compartment 208. It is contemplated that the inner closure assemblies 262 can be positioned around a periphery 265 of the inner compartment lid 212 (FIGS. 10 and 11). Each inner closure assembly 262 provides a pressure point to aid in a sealing connection between the inner compartment lid 212 and the inner peripheral wall 210. Each hinge 250 can also be considered to provide a pressure point. The pressure points can be considered as points where pressure is applied to the sealing assembly 214.

Instead of, or in addition to, the latches 262, any other inner closure assembly can be provided, such as those comprising interconnectable portions associated with the inner compartment lid 212 and the inner peripheral wall 210. The inner closure assembly can comprise one or more of clips, catches, buckles, locks, clasps, bolts, screws and the like. The inner compartment 208 has more pressure points per unit length of its periphery 265 than the outer compartment 202, attributable to a shorter periphery 265 than the outer compartment lid 206 and more pressure points from the plurality of inner hinges 250, and inner closure assemblies 262. In the present implementation, there are three hinges 250 positioned at the forward portion 252 of the inner compartment lid 212 and two inner closure assemblies 262 at the rearward portion 264 of the inner compartment lid 212. At least some of the inner closure assemblies 262 may be oppositely facing the inner hinges 250. There is also has a spacing between pressure points along the periphery 265 of the inner compartment lid 212 which is less than a spacing of pressure points along a periphery 267 (shown in FIG. 5) of the outer compartment lid 206.

Figure 13:
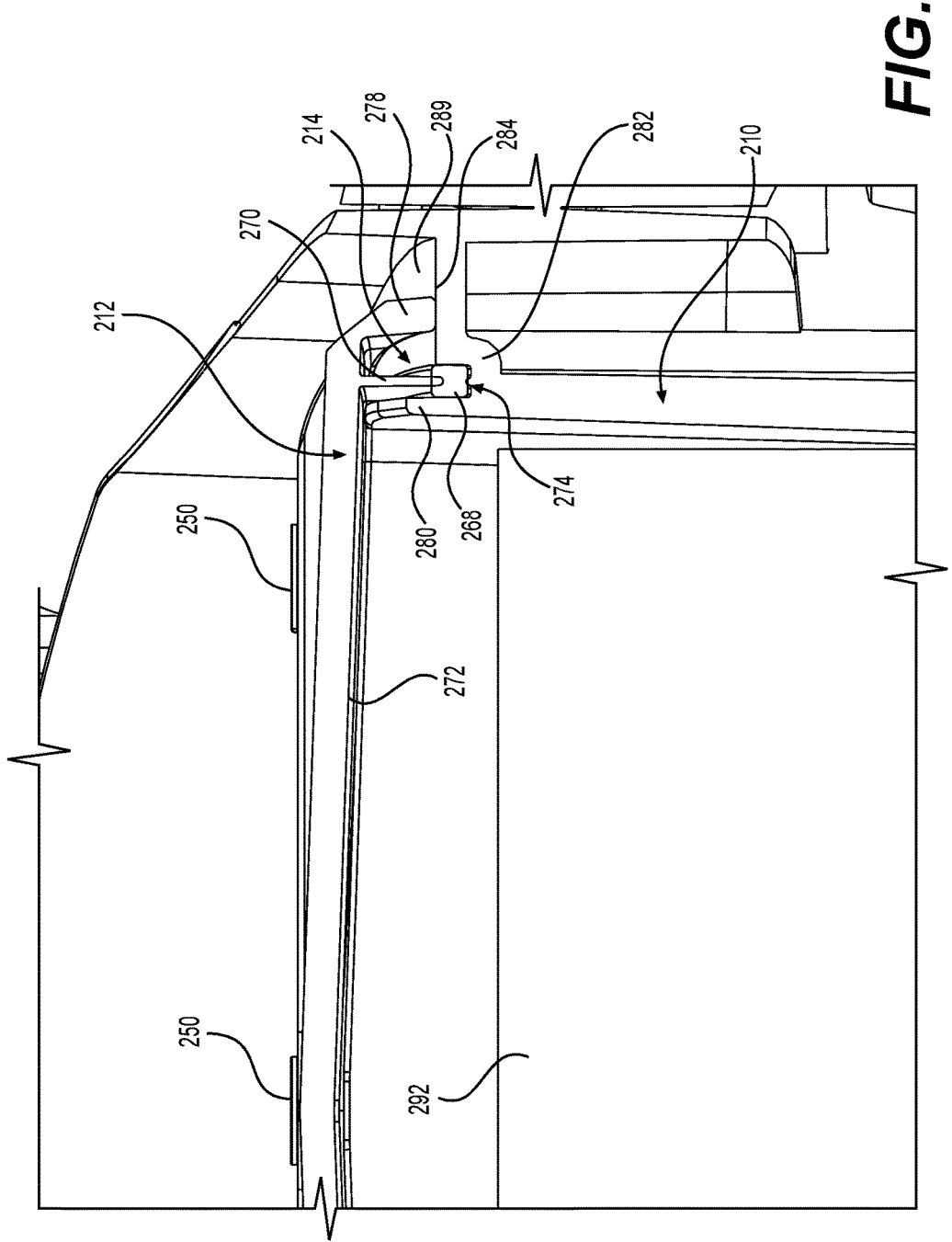
FIG. 13 is a cross-sectional view along the line C-C of a part of the storage assembly of FIG. 8.

The sealing assembly 214 of the inner compartment 208 comprises a seal 268 associated with the inner peripheral wall 210 for sealing the interior of the inner compartment 208 when the inner compartment lid 212 is in the closed position. The seal 268 extends along a rim 266 (FIG. 9) of the inner peripheral wall 210 of the inner compartment 208. The seal 268 can also be associated with the inner compartment lid 212 (not shown). As best seen in FIG. 13, the seal is a gasket 268 acting between inter-engageable portions of the inner peripheral wall 210 and the inner compartment lid 212 such that when the inter-engageable portions are caused to engage, the gasket 268 is compressed and a sealed connection is formed between the inner peripheral wall 210 and the inner compartment lid 212. This provides a sealed storage area inside the interior compartment 208 for storing items sensitive to humidity and/or small amounts of water, such as electronic devices, paper or cardboard items, and leather items (not shown). Other items can also be stored. Other types of seal can also be used, such as those having a compressible or resilient form e.g. oil seals, o-rings, and the like.

The inter-engageable portions comprise a sealing ridge 270 extending generally downwardly from an underside 272 of the inner compartment lid 212, and extending at least partially around the peripheral sides of the inner compartment lid 212. The sealing ridge 270 is receivable in a channel 274 formed along the rim 266 of the rear and side walls 228, 232 and 234 of the inner peripheral wall 210. The gasket 268 is positioned in the channel 274. When the sealing ridge 270 of the inner compartment lid 212 is received in the channel 274 of the inner peripheral wall 210, the sealing ridge 270 abuts the gasket 268 and compresses it when the inner compartment lid 212 is brought to the closed position and the latches 262 are closed. It will be appreciated that the channel could be formed in the inner compartment lid 212, and the sealing ridge in the inner peripheral wall 210.

Extending from the inner compartment lid 212, outwardly of the sealing ridge 270 is an outer lip 278. The channel 274 of the inner peripheral wall 210 has an inner channel arm 280 and an outer channel arm 282. The inner channel arm 280 is higher than the outer channel arm 282, i.e. the inner channel arm 280 extends further upward from the base 226 than the outer channel arm 282. The outer channel arm 282 has a top surface 284 which extends outwardly from the channel 274 and such that the outer lip 278 of the inner compartment lid 212 abuts the top surface 284 when the inner compartment lid 212 is in the closed position.

Figure 9:
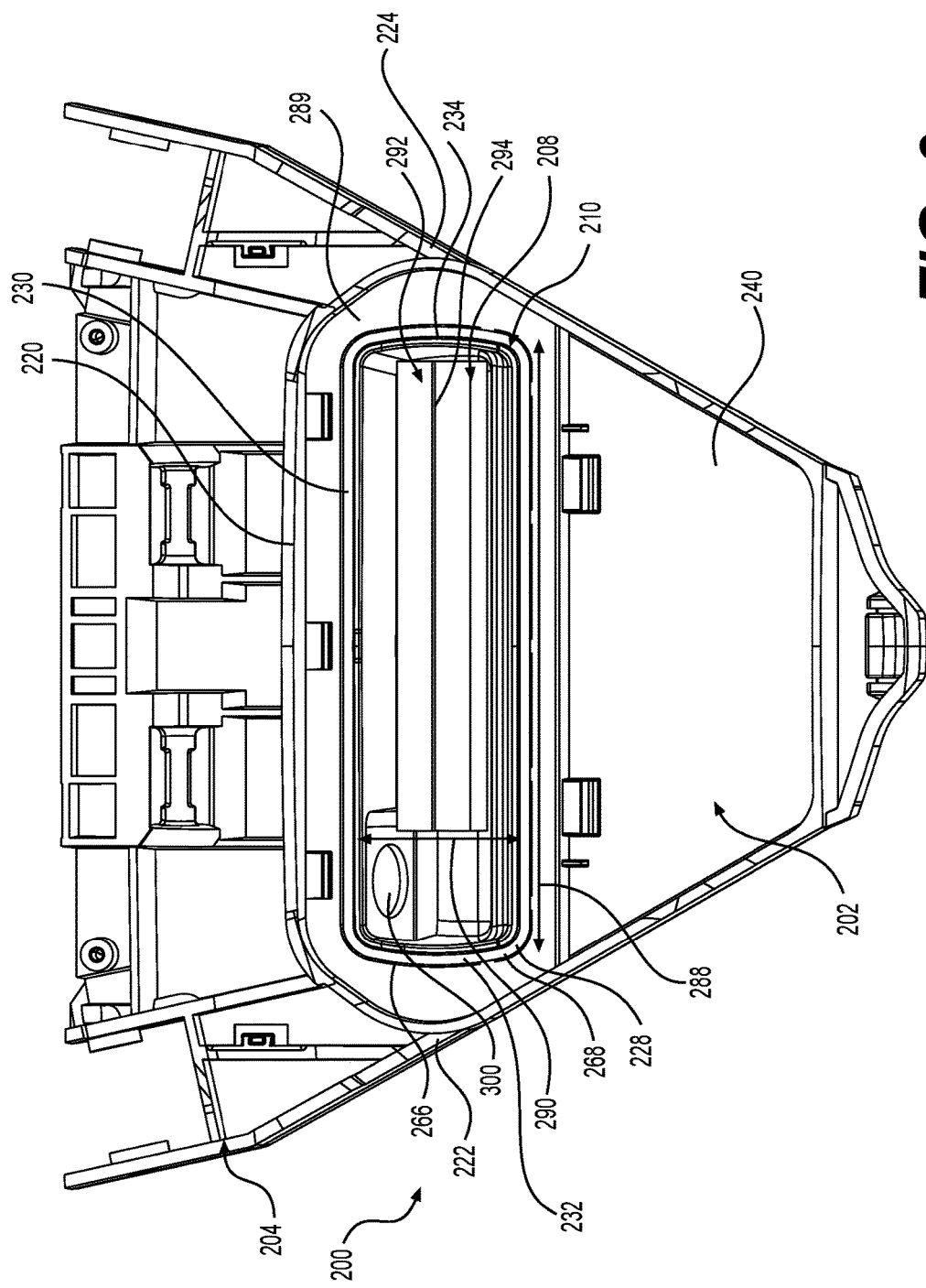
FIG. 9 is a top plan view of the storage assembly of FIG. 9, with the outer and inner compartment lids removed.

With reference to FIGS. 9 and 11, the inner peripheral wall 210 of the inner compartment 208 defining the sealable storage space of the interior compartment 208 has a height dimension 286, a width dimension 288 and a depth dimension 290. The height and width dimensions 286, 288 are greater than the depth dimension 290, and the width dimension 288 is greater than the height dimension 286. The inner compartment 208 is positioned such that its largest dimension, i.e. its width 288, is positioned laterally with respect to the forward-rear orientation of the personal watercraft 20. The width dimension 288 is defined by the distance between the side walls 232, 234 of the inner compartment 208. The depth dimension 290 is defined by the distance between the rear and forward 228, 230 walls of the inner compartment 208. The height dimension 286 is defined by an average height of the rear and forward walls 228, 230 of the inner compartment 208. As can be seen in FIG. 13, the forward wall 230 extends higher from the base 226 than the rear wall 228. This presents a tilted inner compartment opening to the rider which can facilitate access to the interior of the inner compartment 208. A skirt 289 is provided extending outwardly from the outer channel arm 280 of the inner peripheral wall 210. This provides an angled surface defining the opening to the interior of the inner compartment 208. The sealable interior of the inner compartment 208 is sized and shaped to receive at least a cell phone. It is contemplated that a water impermeable air vent, made for example from Gore-Tex™ fabric or the like, be provided in the inner peripheral wall 210 that allows air to travel into and out of the sealed interior compartment so as to enable pressure equalization while blocking passage liquid water.

The inner compartment 208 further comprises a pocket 292 for receiving items, the pocket comprising at least one pocket wall 293 defining a pocket opening 294, the at least one pocket wall 293 being made of a resilient material. In one implementation, shown in FIGS. 9, 11 and 12, the pocket 292 comprises a foam block 292 placed inside the interior of the inner compartment 208. The foam block 292 is shaped and sized to fit inside the interior of the inner compartment 208 when the inner compartment lid 212 is closed. The foam block 292 has a slit 294 formed in it, extending vertically from a top face 296 towards a bottom face 298, and stopping short of the bottom face 298. It is contemplated that the slit 294 could extend between two side faces (not shown) in the foam block 292. The slit 294 is configured to receive electronic devices such as cell phones and hold them in place and the pocket 292 and inner compartment 208 are sized and shaped to store a cell phone or the like securely and safely within the inner compartment 208. The inner compartment 208 also includes an electrical connection such as a USB port 300 for charging the electronic device and/or enabling communication between the electronic device and electronic components of the watercraft 20, such as the instrument cluster 64 and electronic control unit. It is contemplated that the pocket 292 could be made from a material other than foam, such as rubber. It is contemplated that the electrical connection 300 be omitted and that the watercraft 20 be provided with a wireless communication system for communicating wirelessly, for example over Bluetooth, with an electronic device contained in the inner compartment 208. It is also contemplated that the watercraft 20 be provided with a wireless charging system for wireless charging an electronic device contained in the inner compartment 208.

It will be appreciated that a number of barriers to liquid ingress into the inner compartment 208 are provided according to certain implementations of the present disclosure. The outer compartment 202 and the outer compartment lid 206 provide an at least partial barrier to water ingress but in many implementations do not provide a waterproof seal. The sealing assembly 214 of the inner compartment 208 and the inner compartment lid 212 are able to provide a waterproof seal in certain implementations of the present technology when the inner compartment lid 212 is closed. In contrast to a conventional glovebox lid, such as the outer compartment lid 206 of the implementation illustrated in FIGS. 3 to 13, the inner compartment lid 212 is smaller in size, thicker and retained in the closed position by a greater number of pressure points around its periphery 265 via the plurality of hinges 250 and inner closure assemblies 262. This reduced size, increased thickness and the reduced spaces between the pressure points around the sealing assembly 214 help prevent deflection of the inner compartment lid 212 and thereby help to maintain the waterproof seal between the inner compartment lid 212 and the inner peripheral wall 210. The outer lip 278 abutting the top surface 284 of the outer channel arm 282 when the inner compartment lid 212 is closed provides an initial barrier against water ingress into the inner compartment 208. Finally, when the inner compartment lid 212 is opened, the inner channel arm 280, which is raised relative to the outer channel arm 282, provides an additional barrier to liquid ingress. Any water that enters the outer compartment 202 when the outer compartment lid 206 and inner compartment lid 212 are both open will be guided around the inner compartment 208, between the inner channel arm 280 and the proximate side walls 222, 224. The outer compartment lid 212 when in the open position can protect the interiors of the outer and inner compartments 202, 208 from incoming spray, depending on the wind direction.

Figure 14:
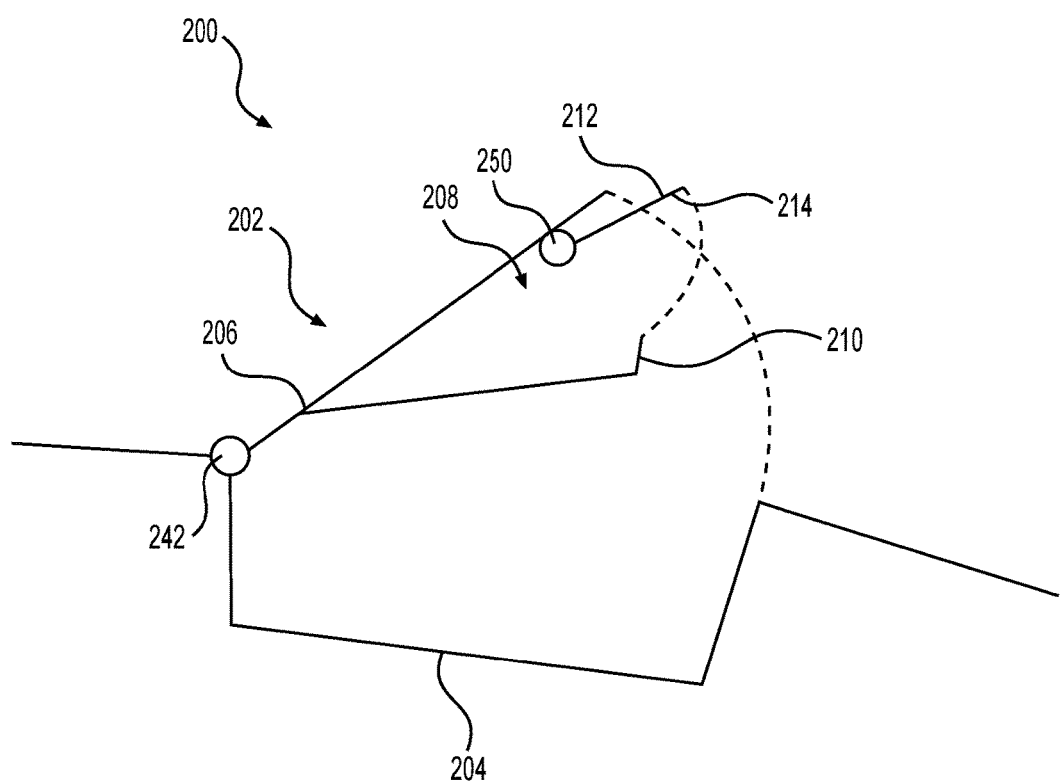
FIG. 14 is a schematic illustration of a storage assembly according to another implementation of the present disclosure.

In another implementation, shown in FIG. 14, the inner compartment 208 is formed integrally with at least a part of the outer compartment lid 206, instead of with the outer peripheral wall 204. In this implementation, the inner compartment lid 212 is operatively connected to an inner side 302 of the outer compartment lid.

The personal watercraft 20 has other features and components which would be readily recognized by one of ordinary skill in the art, further explanation and description of these components will not be provided herein.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A storage assembly for a vehicle, the storage assembly comprising:
    an outer compartment defined by an outer peripheral wall and an outer compartment lid when in a closed position, the outer compartment lid operatively connected to the outer peripheral wall and being moveable between an open position providing access to an interior of the outer compartment and the closed position blocking access to the interior of the outer compartment; and an inner compartment integrally formed within the outer compartment and enclosed thereby, the inner compartment being defined by an inner peripheral wall and an inner compartment lid when in a closed position, the inner compartment lid being operatively connected to the inner peripheral wall and being moveable between an open position providing access to an interior of the inner compartment and the closed position blocking access to the interior of the inner compartment, and a sealing assembly for sealing the interior of the inner compartment when the inner compartment lid is in the closed position.

2. The storage assembly of claim 1, wherein the sealing assembly comprises a seal associated with one or both of the inner peripheral wall and the inner compartment lid.

3. The storage assembly of claim 2, wherein the seal is a gasket positioned between inter-engageable portions of the inner peripheral wall and the inner compartment lid.

4. The storage assembly of claim 3, wherein the inter-engageable portions comprise a sealing ridge extending from an underside of the inner compartment lid and receivable in a channel formed along a rim of at least a portion of the inner peripheral wall, the channel containing the gasket therein.

5. The storage assembly of claim 1, wherein at least a part of the inner peripheral wall is integral with at least a part of the outer peripheral wall.

6. The storage assembly of claim 1, further comprising an inner closure assembly for securing the inner compartment lid in the closed position, the inner closure assembly comprising an associated pair of interconnectable portions for acting between the inner compartment lid and the inner peripheral wall.

7. The storage assembly of claim 6, wherein the inner closure assembly comprises a plurality of the associated pair of interconnectable portions positioned around a periphery of the inner compartment lid.

8. The storage assembly of claim 7, wherein the inner compartment comprises three hinges positioned along a first side of the inner compartment lid and two inner closure assemblies along the periphery of the inner compartment lid along a second side of the inner compartment lid, opposite the first side.

9. The storage assembly of claim 7, wherein a spacing between pressure points along the periphery of the inner compartment lid is less than a spacing of pressure points along a periphery of the outer compartment lid.

10. The storage assembly of claim 1, wherein the inner peripheral wall defines a sealable storage space that has a vertical height dimension, a lateral width dimension and a forward-rear depth dimension, the height and width dimensions being greater than the depth dimension.

11. The storage assembly of claim 1, wherein the inner compartment lid has a greater average thickness per unit area than the outer compartment lid.

12. The storage assembly of claim 1, wherein the inner peripheral wall comprises a forward wall, a rear wall and two side walls defining an opening into the interior of the inner compartment, one of said forward and rear walls being shorter than the other to present an angled opening.

13. The storage assembly of claim 1, wherein the outer compartment lid is operatively connected to the outer peripheral wall by at least one hinge and the inner compartment is positioned proximate the at least one hinge of the outer compartment.

14. A vehicle comprising:
a vehicle body having at least one external surface;
an engine disposed at least in part in the vehicle body;
a propulsion system connected to the vehicle body and operatively connected to the engine;
a storage assembly provided in the vehicle body, the storage assembly comprising:
an outer compartment defined by an outer peripheral wall and an outer compartment lid when in a closed position, the outer compartment lid operatively connected to the outer peripheral wall and being moveable between an open position providing access to an interior of the outer compartment and the closed position blocking access to the interior of the outer compartment; and
an inner compartment integrally formed within the outer compartment and enclosed thereby, the inner compartment being defined by an inner peripheral wall and an inner compartment lid when in a closed position, the inner compartment lid being operatively connected to the inner peripheral wall and being moveable between an open position providing access to an interior of the inner compartment and the closed position blocking access to the interior of the inner compartment, and a sealing assembly for sealing the interior of the inner compartment when the inner compartment lid is in the closed position.

15. The vehicle of claim 14, further comprising a straddle seat, wherein the storage assembly is positioned forward of the straddle seat.

16. The vehicle of claim 15, further comprising a handlebar, wherein the storage assembly is positioned between the handlebar and the straddle seat.

17. The vehicle of claim 16, wherein the vehicle is a personal watercraft, and the vehicle body comprises a hull and a deck supported on the hull, the straddle seat provided on the deck, the propulsion system being connected to the hull, and the storage assembly provided in the deck.

18. The vehicle of claim 17, wherein the outer compartment is a glovebox formed in the deck.

19. The vehicle of claim 18, the deck further comprising a ridge extending along at least a portion of an outer perimeter of the outer compartment.

20. The vehicle of claim 17, wherein the storage assembly is integrally formed in the deck.

* * * * *